United States Patent [19]
Pattok et al.

[11] Patent Number: 6,076,628
[45] Date of Patent: Jun. 20, 2000

[54] POWER ASSIST APPARATUS FOR MOTOR VEHICLE STEERING

[75] Inventors: Eric David Pattok; Ernest Jefferson Hynds, both of Saginaw, Mich.

[73] Assignee: General Motors Corporation, Detroit, Mich.

[21] Appl. No.: 08/803,463

[22] Filed: Feb. 20, 1997

[51] Int. Cl.⁷ ..................................................... B62D 5/04
[52] U.S. Cl. .......................................... 180/444; 74/396
[58] Field of Search .................................. 180/443, 444, 180/446, 426; 74/388, 396, 425

[56] References Cited

U.S. PATENT DOCUMENTS

| | | | |
|---|---|---|---|
| 1,948,487 | 2/1934 | Berry | 180/79.1 |
| 2,335,606 | 11/1943 | Pelphrey | 74/396 |
| 2,553,795 | 5/1951 | Staude | 74/388 |
| 2,754,465 | 7/1956 | Brier | 318/488 |
| 3,191,109 | 6/1965 | Hepner | 318/2 |
| 3,753,375 | 8/1973 | Colletti | 74/498 |
| 5,445,237 | 8/1995 | Eda et al. | 180/79.1 |
| 5,482,128 | 1/1996 | Takaoka et al. | 180/444 |

*Primary Examiner*—Anne Marie Boehler
*Attorney, Agent, or Firm*—Edmund P Anderson

[57] ABSTRACT

A power assist apparatus for a motor vehicle steering shaft including a speed reducer housing mounted on a steering column, an electric motor on the speed reducer housing, and a speed reducer consisting of a worm gear and a worm wheel. The worm gear is supported on the speed reducer housing for rotation with an output shaft of the electric motor. The worm wheel is rigidly connected to the steering shaft. The steering shaft is rotatably mounted on a bearing carrier having a cylindrical pilot which cooperates with a cylindrical journal on the speed reducer housing in rotatably supporting the bearing carrier on the speed reducer housing. The cylindrical pilot is eccentric relative to a longitudinal centerline of the steering shaft so that the steering shaft and the worm wheel traverse a circular orbit in the plane of the worm wheel when the bearing carrier rotates relative to the speed reducer housing. The circular orbit of the worm wheel has a component perpendicular to the worm gear to eliminate lash therebetween. The position of the bearing carrier relative to the speed reducer housing is captured by a ring clamped to the speed reducer housing over the bearing carrier.

4 Claims, 3 Drawing Sheets

POWER ASSIST APPARATUS FOR MOTOR VEHICLE STEERING

TECHNICAL FIELD

This invention relates to power assist apparatus for motor vehicle steering.

BACKGROUND OF THE INVENTION

Motor vehicles commonly include a steering shaft, a manual steering wheel on the steering shaft, and a steering gear which steers dirigible wheels of the motor vehicle in response to rotation of the steering shaft. Power assist apparatuses have been proposed through which manual effort applied at the steering wheel by a driver of the motor vehicle is supplemented by output torque of an electric motor connected to the steering shaft through a speed reducer consisting of a worm gear driven by the electric motor and a worm wheel connected to the steering shaft. Performance of such power assist apparatuses is optimized when lash between the worm gear and the worm wheel is minimized. A power assist apparatus according to this invention for motor vehicle steering is constructed for simple and effective elimination of lash between a worm gear and a worm wheel of a speed reducer of the power assist apparatus.

SUMMARY OF THE INVENTION

This invention is a new and improved power assist apparatus for motor vehicle steering including speed reducer housing mounted rigidly on a steering column of the motor vehicle, an electric motor on the speed reducer housing, and a speed reducer consisting of a worm gear and a worm wheel between an output shaft of the electric motor and the steering shaft. The worm gear is supported on the speed reducer housing for rotation as a unit with an output shaft of the electric motor. The worm wheel is rigidly connected to the steering shaft. The steering shaft is rotatably mounted on a bearing carrier having a cylindrical pilot which cooperates with a cylindrical journal on the speed reducer housing in rotatably supporting the bearing carrier on the speed reducer housing. The cylindrical pilot on the bearing carrier is eccentric relative to a longitudinal centerline of the steering shaft so that the steering shaft and the worm wheel traverse a circular orbit in the plane of the worm wheel when the bearing carrier rotates relative to the speed reducer housing. The circular orbit of the worm wheel has a component perpendicular to the worm gear which moves gear teeth on the worm wheel toward a spiral tooth on the worm gear to minimize dimensional clearance, i.e. lash, therebetween. The position of the bearing carrier relative to the speed reducer housing is captured by a ring clamped to the speed reducer housing over the bearing carrier.

DESCRIPTION OF THE PREFERRED EMBODIMENT

Figure 1:
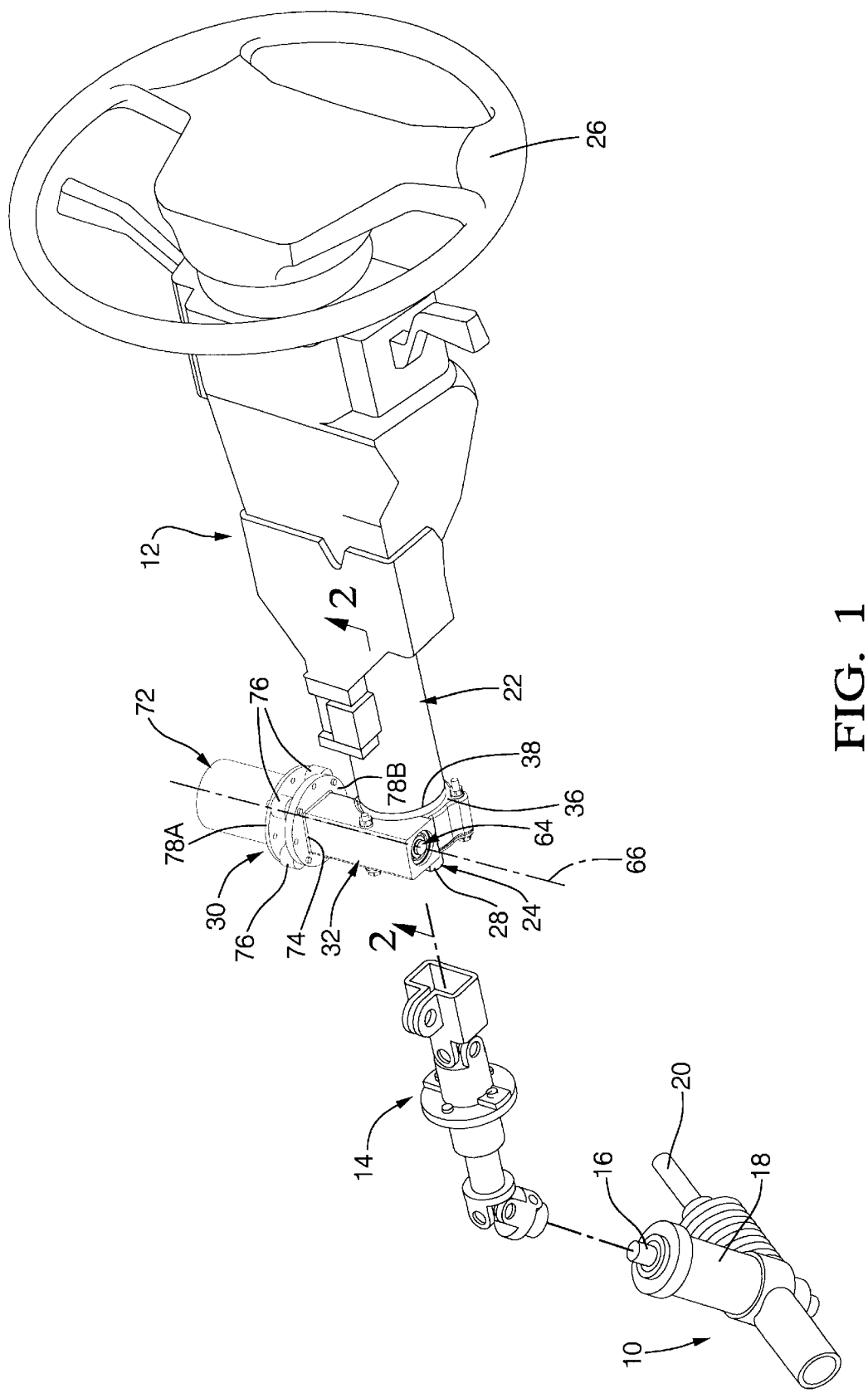
FIG. 1 is a perspective view of a motor vehicle steering column having a power assist apparatus according to this invention thereon.

Referring to FIG. 1, a motor vehicle, not shown, has mounted thereon a steering gear 10, a steering column 12, and an intermediate steering shaft 14. The steering gear 10 includes an input shaft 16 rotatably supported on a housing 18 of the steering gear and a rack bar 20 supported on the housing 18 for back and forth linear translation in response to rotation of the input shaft. Opposite ends, not shown, of the rack bar are linked to dirigible wheels of the motor vehicle for steering the vehicle in the usual fashion in response to rotation of the input shaft 16.

The steering column 12 includes a tubular mast jacket 22 adapted for rigid attachment to a body structure, not shown, of the motor vehicle, a steering shaft 24, and a manual steering wheel 26 rigidly attached to the steering shaft at the top of the mast jacket. The intermediate steering shaft 14 links the steering shaft 24 and the steering gear input shaft 16 and conducts manual effort applied at the steering wheel 26 from an inboard end 28 of the steering shaft to the input shaft of the steering gear. A power assist apparatus 30 according to this invention on the steering column 12 supplements manual effort applied at the steering wheel 26.

Figure 2:
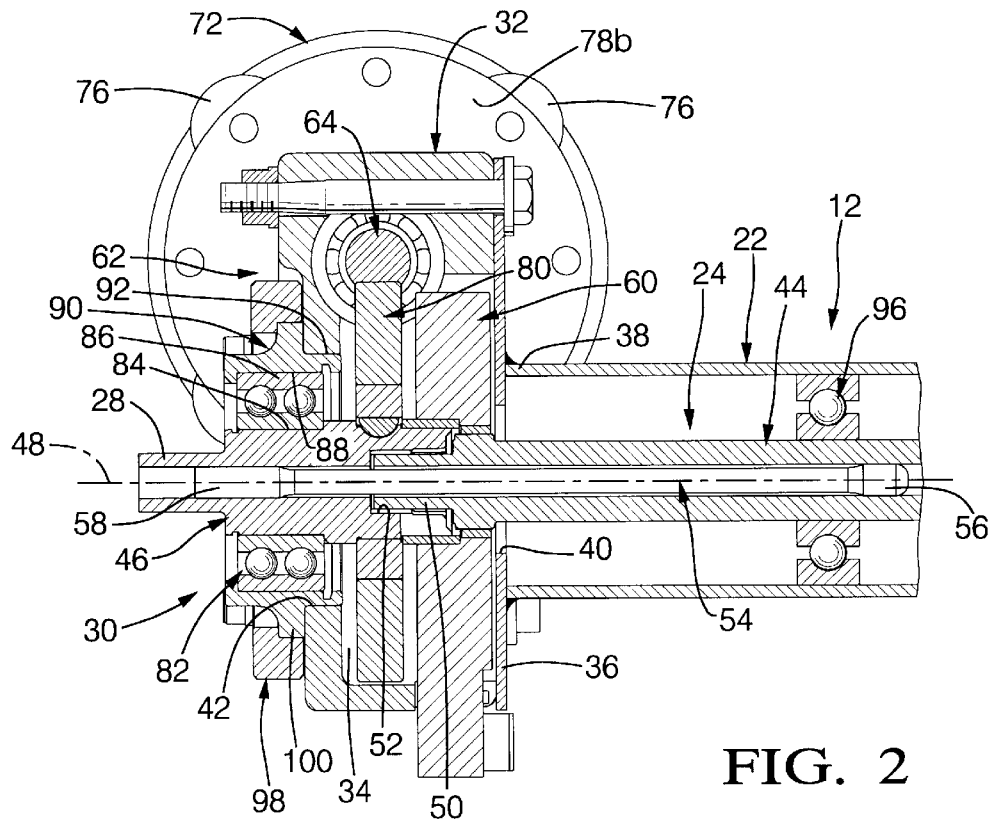
FIG. 2 is a sectional view taken generally along the plane indicated by lines 2—2 in FIG. 1.
Figure 5:
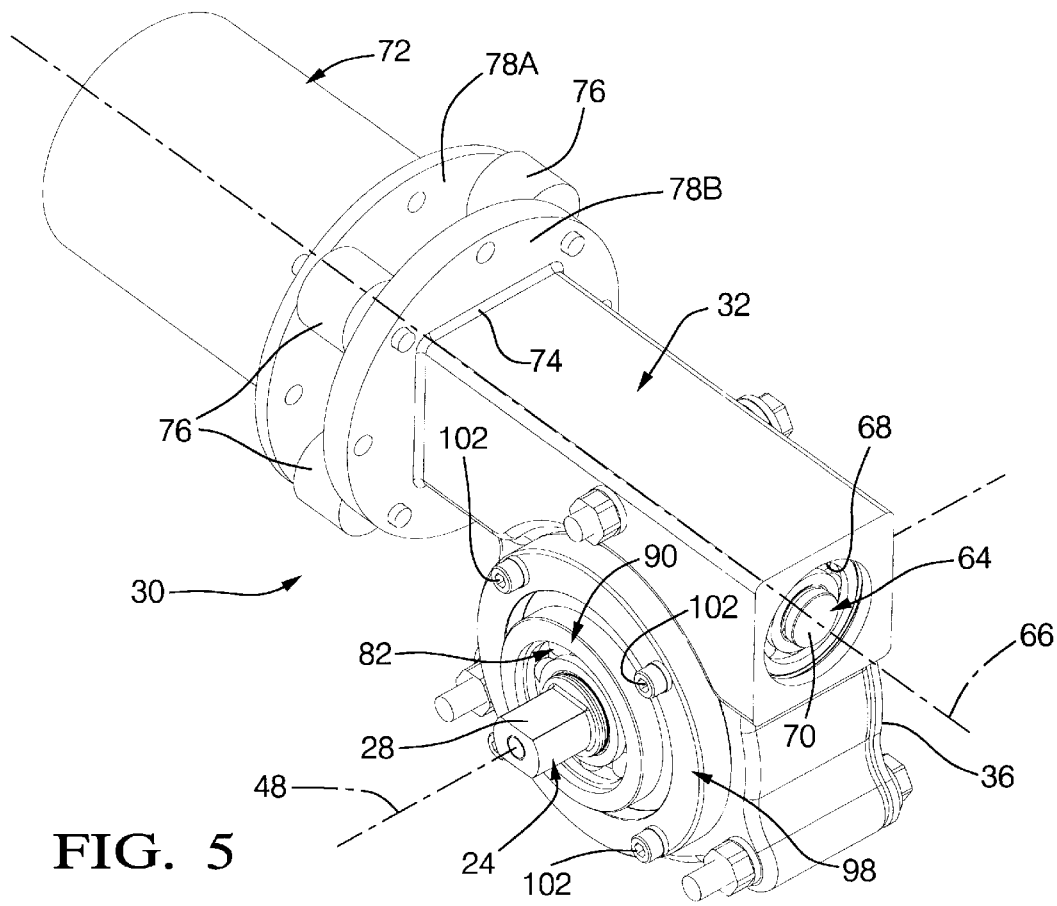
FIG. 5 is a perspective view of the power assist apparatus according to this invention.

As seen best in FIGS. 1, 2 and 5, the power assist apparatus 30 includes a speed reducer housing 32 having an internal chamber 34 therein and an end plate 36 bolted to the housing on one side of the internal chamber. A lower end 38 of the tubular mast jacket 22 of the steering column is welded to the end plate 36 for rigidly attaching the speed reducer housing 32 to the steering column. The internal chamber 34 communicates with the interior of the mast jacket 22 through an opening 40 in the end plate and is open on the opposite side through an inward-facing cylindrical journal 42 of the speed reducer housing.

The steering shaft 24 traverses the internal chamber 34 of the speed reducer housing through the opening 40 in the end plate 36 and through the cylindrical journal 42 and consists of a tubular upper shaft segment 44 and a tubular lower shaft segment 46. The upper shaft segment 44 is rotatable relative to the lower shaft segment 46 about a longitudinal centerline 48 of the steering shaft through a total angle of about eight degrees. A reduced diameter end 50 of the upper shaft segment 44 cooperates with a counterbore 52 in a facing end of the lower shaft segment 46 in accommodating such relative rotation and in rigidifying the steering shaft against beam bending perpendicular to the longitudinal centerline 48 at the interface between the upper and the lower shaft segments.

A torsion bar 54 inside the tubular upper and lower shaft segments 44, 46 has a first end 56 rigidly attached to the upper shaft segment 44 and a second end 58 rigidly attached to the lower shaft segment. The torsion bar defines a center position of the tubular upper shaft segment relative to the tubular lower shaft segment and resiliently resists relative rotation of the upper shaft segment from its center position in either direction. A schematically represented transducer 60 in the internal chamber 34 of the speed reducer housing 32 measures relative rotation of the upper shaft segment 44 and provides a corresponding signal to an electronic control module, not shown.

A speed reducer 62 of the power assist apparatus 30 includes a worm gear 64 supported on the speed reducer housing 32 for rotation about a centerline 66 of the speed reducer housing by a plurality of ball bearings including a bearing 68, FIG. 5, near an end 70 of the worm gear. The worm gear is connected to an output shaft, not shown, of an electric motor 72 of the power assist apparatus for rotation as a unit with the output shaft. The electric motor 72 is mounted on an end 74 of the speed reducer housing through a plurality of elastomeric isolators 76 between a pair of flanges 78A, 78B on the motor and on the speed reducer housing, respectively.

A worm wheel 80 of the speed reducer 62 has gear teeth, not shown, around its periphery which mesh with a spiral tooth, not shown, on the worm gear 64 and is connected to the tubular lower shaft segment 46 of the steering shaft 24 for unitary rotation therewith about the longitudinal centerline 48 of the steering shaft. A double row ball bearing 82 of relatively high precision manufacture mounted on a cylindrical surface 84 of the tubular lower shaft segment 46 has an outer race 86 rotatable about the longitudinal centerline 48 of the steering shaft. The outer race 86 seats in a socket 88 in a bearing carrier 90 with an interference fit which prevents relative rotation between the outer race and the bearing carrier and is retained in the socket by a retaining ring, not shown, on the bearing carrier. The center of the socket 88 in the bearing carrier 90 coincides substantially precisely with the longitudinal centerline 48 of the steering shaft.

Figure 3:
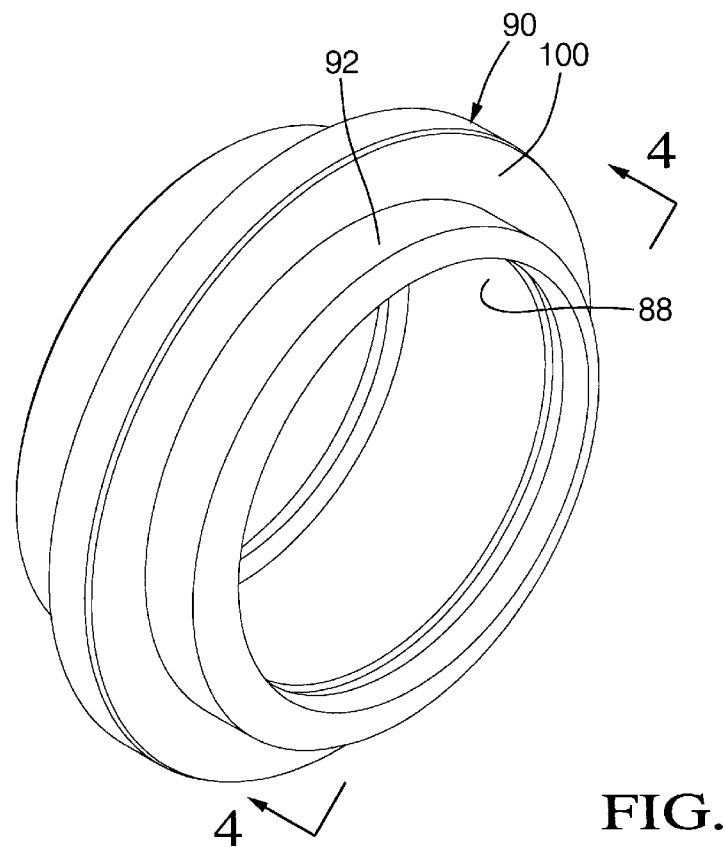
FIG. 3 is a perspective view of a bearing carrier of the power assist apparatus according to this invention.
Figure 4:
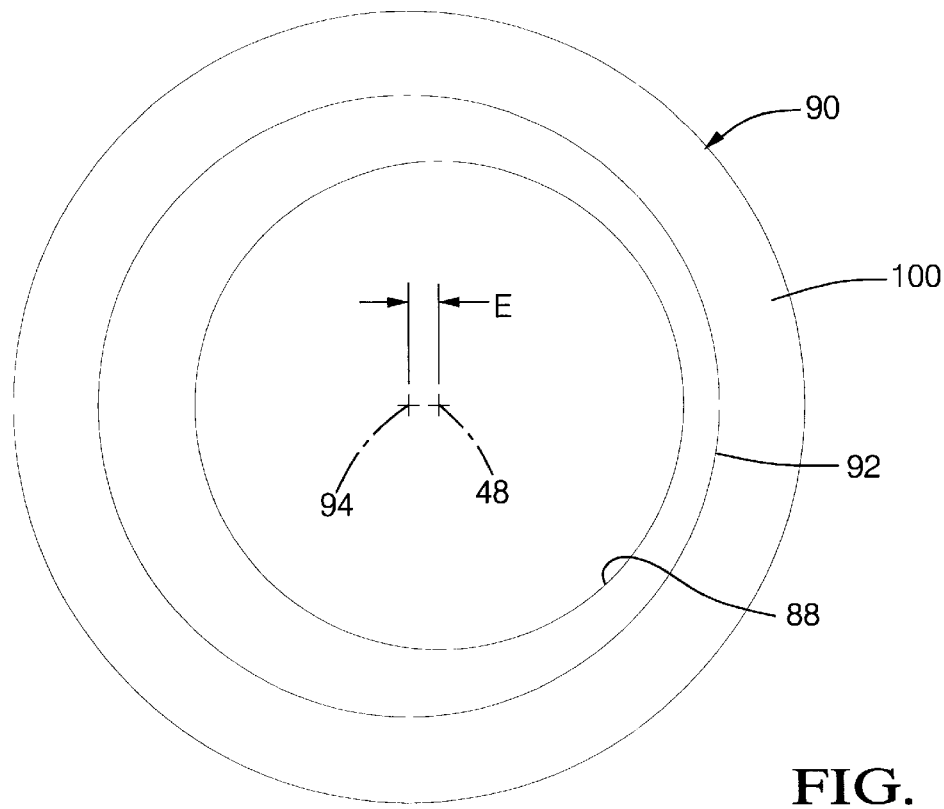
FIG. 4 is a view taken generally along the plane indicated by lines 4—4 in FIG. 3.

As seen best in FIGS. 3–4, an outer cylindrical surface 92 on the bearing carrier defines a pilot which cooperates with the cylindrical journal 42 on the speed reducer housing 32 in rotatably supporting the bearing carrier on the speed reducer housing. The outer cylindrical surface 92 is eccentric relative to the socket 88 in the bearing carrier 90 so that a centerline 94 of the outer cylindrical surface 92 is laterally offset from the longitudinal centerline 48 of the steering shaft 24 by an eccentricity dimension "E" illustrated in exaggerated fashion in FIG. 4. For practical applications, an eccentricity dimension "E" of about 0.25 mm may be anticipated.

A bearing 96, FIG. 2, between the tubular upper segment 44 of the steering shaft and the mast jacket 22 of the steering column of less manufacturing precision than and remote from the double row ball bearing 82 accommodates relative movement between the steering shaft 24 and the mast jacket 22 induced by relative rotation between the bearing carrier 90 and the speed reducer housing. A ring 98 around the bearing carrier 90 bears against a flange 100 on the bearing carrier to rotationally immobilize the bearing carrier relative to the speed reducer housing 32 when the ring 98 is clamped to the speed reducer housing by a plurality of fasteners 102, FIG. 5.

With the aforesaid gear teeth on the periphery of the worm wheel 80 in mesh with the aforesaid spiral tooth on the worm gear 64 and the ring 98 loose on the speed reducer housing, dimensional clearance, i.e. lash, between the worm gear and the worm wheel is minimized by rotating the bearing carrier 90 and the outer cylindrical surface 92 thereon relative to the speed reducer housing 32 and the cylindrical journal 42 therein. Because of the eccentricity dimension "E", rotation of the bearing carrier 90 relative to the speed reducer housing 32 causes the socket 88 to cooperate with the double row ball bearing 82 to induce motion in the plane of the worm wheel 80 of the tubular lower shaft segment 46, the longitudinal centerline 48 of the steering shaft 24, and the worm wheel 80 in a circular orbit having a diameter equal to twice the eccentricity dimension "E".

The aforesaid orbital motion of the worm wheel 80 has components parallel and perpendicular to the centerline 66 of the speed reducer housing about which the worm gear 64 rotates. The parallel component induces linear translation of the worm wheel in the length direction of the worm gear 64 which may result only in slight relative rotation between the worm gear and the worm wheel. The perpendicular component moves the worm wheel 80 toward the worm gear 64, which convergence reduces the dimensional clearance between the spiral tooth on the worm gear and the teeth of the worm wheel until a predeterminedly small clearance is achieved corresponding to effectively zero lash between the worm gear and the worm wheel. The corresponding position of the bearing carrier 90 relative to the speed reducer housing 32 is then captured by tightening the fasteners 102 to clamp the ring 98 to the speed reducer housing 32 with the flange 100 of the bearing carrier therebetween.

Manual effort applied at the steering wheel 26 to steer the motor vehicle induces relative rotation of the tubular upper shaft segment 44 from its center position against the torsion bar 54 due to friction at the dirigible road wheels which resists corresponding rotation of the tubular lower shaft segment. The transducer 60 provides to a control module, not shown, an electronic signal corresponding to the direction and magnitude of such relative rotation which induces the control module to turn on the electric motor 72 in a direction corresponding to the direction of the applied manual effort. The output torque of the electric motor is conducted to the steering shaft 24 through the worm gear 64 and the worm wheel 80 to supplement the applied manual effort.

We claim:

1. A power assist apparatus for motor vehicle steering, comprising:

a steering column on said motor vehicle including a mast jacket, a steering shaft in said mast jacket including an upper shaft segment connected to a steering wheel on said steering column and a lower shaft segment connected to a steering gear on said motor vehicle, a speed reducer housing rigidly attached to said mast jacket, an electric motor mounted on said speed reducer housing, a worm gear rotatably supported on said speed reducer housing driven by said electric motor, a worm wheel meshing with said worm gear rigidly attached to said lower shaft segment of said steering shaft in a plane perpendicular to a longitudinal centerline of said steering shaft for rotation as a unit with said lower shaft segment of said steering shaft, a bearing carrier, a support means operative to rotatably support said bearing carrier on said speed reducer housing, a socket in said bearing carrier eccentric relative to said support means traversing a circular orbit in a plane parallel to the worm wheel concurrent with rotation of said bearing carrier relative to said speed reducer housing, a bearing on said lower shaft segment of said steering shaft on one side of said worm wheel interference fitted in said socket in said bearing carrier so that said bearing constitutes the exclusive rotational support of said lower shaft segment of said steering shaft on said speed reducer housing and so that said lower shaft segment of said steering shaft with said worm wheel thereon traverses said circular orbit concurrent with rotation of said bearing carrier relative to said speed reducer housing to minimize lash between said worm gear and said worm wheel; and a clamp means operative to rotationally immobilize said bearing carrier relative to said speed reducer housing.

2. The power assist apparatus recited in claim 1 wherein said bearing on said lower segment of said steering shaft interference fitted in said socket in said bearing carrier comprises:

a double row ball bearing having an inner race on a cylindrical surface of said steering shaft and an outer race interference fitted in said socket in said bearing carrier.

3. The power assist apparatus recited in claim 2 wherein said support means operative to rotatably support said bearing carrier on said speed reducer housing comprises:

a cylindrical surface on said bearing carrier laterally offset relative to said socket in said bearing carrier, and a cylindrical journal on said speed reducer housing around said cylindrical surface on said bearing carrier.

4. The power assist apparatus recited in claim 3 wherein said clamp means operative to rotationally immobilize said bearing carrier relative to said speed reducer housing comprises:

an annular flange on said bearing carrier, a ring around said bearing carrier bearing against said annular flange, and a plurality of fasteners operative to clamp said ring against said speed reducer housing with said annular flange on said bearing carrier therebetween.

\* \* \* \* \*